June 13, 1967 R. H. POWELL ET AL 3,324,827
HOLDER FOR WORKPIECES OF VARYING THICKNESS
Filed Oct. 28, 1964 5 Sheets-Sheet 2
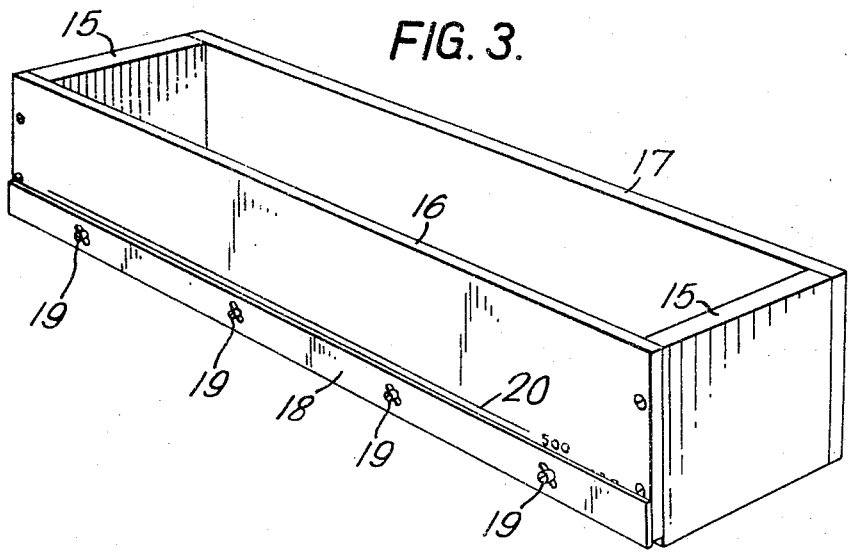
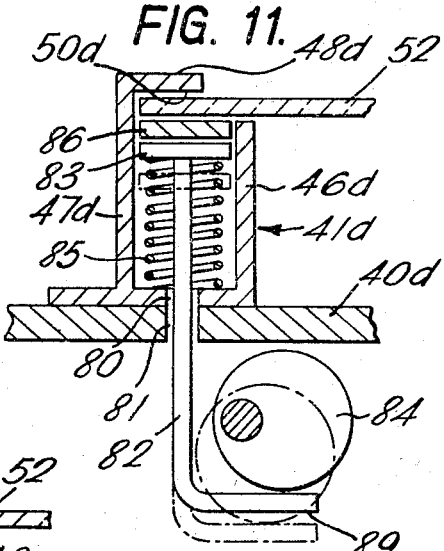
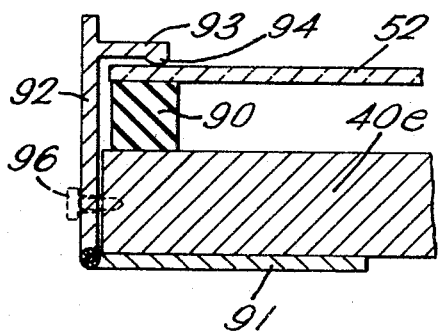

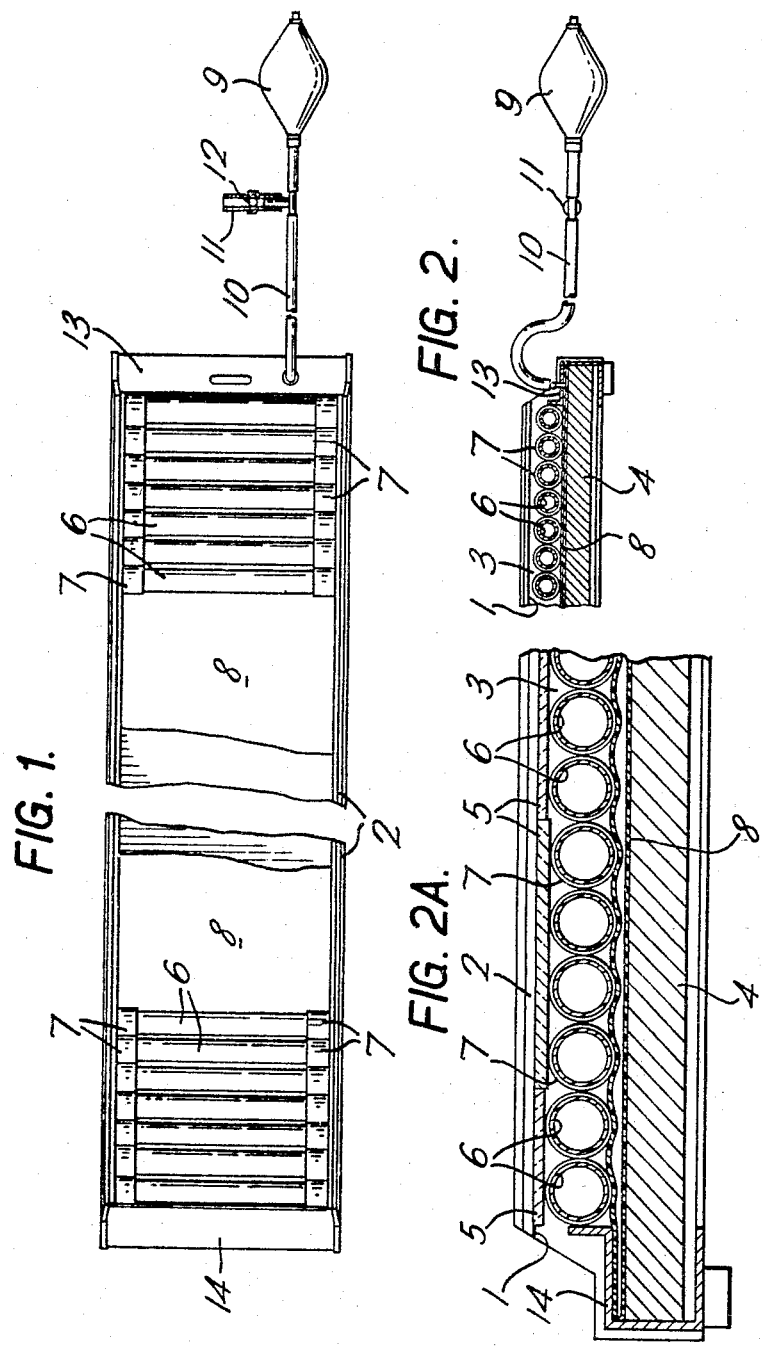

June 13, 1967 R. H. POWELL ETAL 3,324,827
HOLDER FOR WORKPIECES OF VARYING THICKNESS
Filed Oct. 28, 1964 5 Sheets-Sheet 3

June 13, 1967 R. H. POWELL ET AL 3,324,827
HOLDER FOR WORKPIECES OF VARYING THICKNESS
Filed Oct. 28, 1964 5 Sheets-Sheet 4

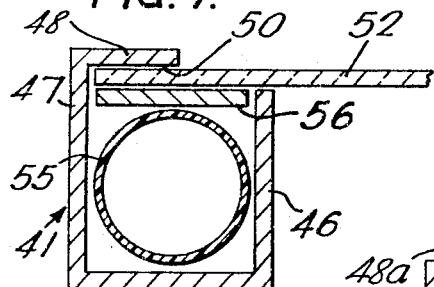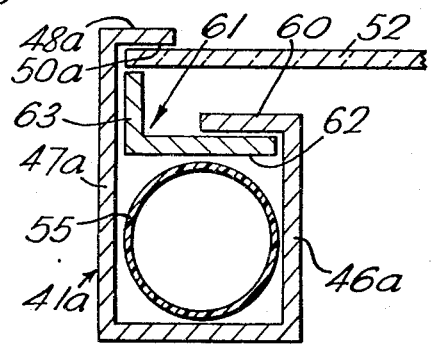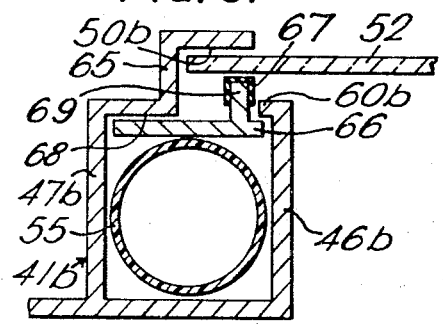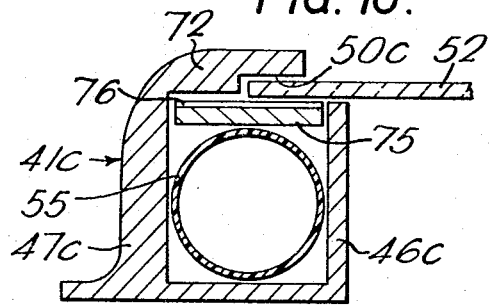

United States Patent Office 3,324,827
Patented June 13, 1967

3,324,827
HOLDER FOR WORKPIECES OF
VARYING THICKNESS
Robert Henry Powell, Kenley, Cyril Williamson Burnell, West Bridgford, and Anny Emma Louise Edouard McMath, London, England, assignors to Shandon Scientific Company Limited, London, England, a British company
Filed Oct. 28, 1964, Ser. No. 406,991
1 Claim. (Cl. 118—503)

This application is a continuation-in-part of our copending patent application Ser. No. 238,125 filed on Nov. 16, 1962, now abandoned, and entitled, "Surface Coating of Plates."

In some processes, such as in "thin-layer" chromatography, it is necessary to apply surface coatings to plane-surfaced plates. As is now well known, thin-layer chromatography is performed in a manner analogous to paper chromatography but with the use of plates, usually of glass a few millimetres thick, carrying a layer, usually having a thickness up to about 3000 microns, of absorbent material that takes the place of the paper used in paper chromatography. Thus, a small quantity of material being investigated is placed on such layer near an edge of the plate and a suitable solvent is caused to travel, by capillarity, through the layer towards the opposite edge of the plate to transport the different constituents of the material at different rates in accordance with the relative partition adsorption and solubility characteristics of the constituents, whereby the constituents become spatially separated along the direction of their movement in the layer.

In order to obtain reproducible results from chromatographic runs carried out with the same materials under identical conditions, it is essential that the surface coating of the plates should be uniform in composition and thickness. Uniformity of the coating composition may be achieved by appropriate care in the preparation thereof, and, when necessary, by coating a set of plates required for any particular investigation with a common coating material applied to all of the plates of the set in a single operation.

Conventionally, application of the coating material to a set of plates is carried out by disposing the plates of the set on a suitable flat base in side-by-side juxtaposition and then applying the coating material to the plates by traversing the set from end to end with a spreader device incorporating a doctor blade that is intended to leave on each plate of the set a layer of coating material of the chosen thickness. The coating material may, for instance, be finely-divided silica gel or alumina and usually contains a cementitious material such as plaster of Paris and is applied as an aqueous slurry which dries out and sets to leave an adherent layer of its solid constituents on the glass. Before use of the plates, the dried coating may be activated by suitable treatment.

The above conventional coating technique suffers from the defect that variations in the thickness of the plates of a set results in non-uniformity of the coating layer applied thereto, since the spreader device used for applying the coating tilts and moves vertically when it passes from a plate having its upper surface at one level to a plate having its upper surface at another level. This problem cannot be overcome by providing continuous guides for the spreader device, since, whilst this would prevent titlting and vertical displacement of the spreader device in moving over the set of plates, it would instead lead to thicker coatings on thinner plates of the set and vice versa owing to differences in vertical spacing between the guides and the upper surfaces of plates of different thickness.

An object of the invention is therefore to provide apparatus of simple and robust construction adapted to enable a set of plane-surfaced plates differing in thickness and arranged side-by-side to be uniformly coated with a coating material, a more specific object of the invention being to provide an apparatus designed to facilitate the achievement of uniform coating of a set of thin-layer chromatography plates.

A second object of the invention is to provide apparatus for pressing opposite edge portions of the faces of chromatographic plates against co-planar locating surfaces without bulging the intermediate portions of the plates.

A third object of the invention is to provide apparatus for supporting the faces of plates in a common plane so that they can be readily coated with a uniform thickness of a coating slurry without contamination of the operative parts of the apparatus by parts of the slurry which are squeezed between the plates during coating thereof.

A fourth object of the invention is the provision of apparatus having means for uniformly pressing the undersides of opposite edge portions of chromatographic plates towards two parallel co-planar locating surfaces.

A fifth object of the invention is the provision of improved chromatographic plate-coating apparatus.

How these and other objects of the invention are fulfilled will become apparent by reading the following description of examples of the invention shown in the accompanying drawings, in which:

FIGURE 1 is a plan view of apparatus in accordance with the invention adapted for coating thin-layer chromatography plates;

FIGURES 2 and 2A are, together, a longitudinal vertical sectional view of the apparatus shown in FIGURE 1, FIGURE 2A being drawn to a larger scale and showing plates supported ready for coating;

FIGURE 3 is a perspective view of a suitable spreader device for use with the apparatus of FIGURES 1, 2 and 2A;

FIGURE 7 is a section of part of the apparatus of FIGURE 5 and along the line indicated by the arrows VII—VII in that figure; and, FIGURES 8 to 12 are respectively sections corresponding to FIGURE 7 but of modified versions of the apparatus shown in FIGURES 5 and 6.

Figure 4:
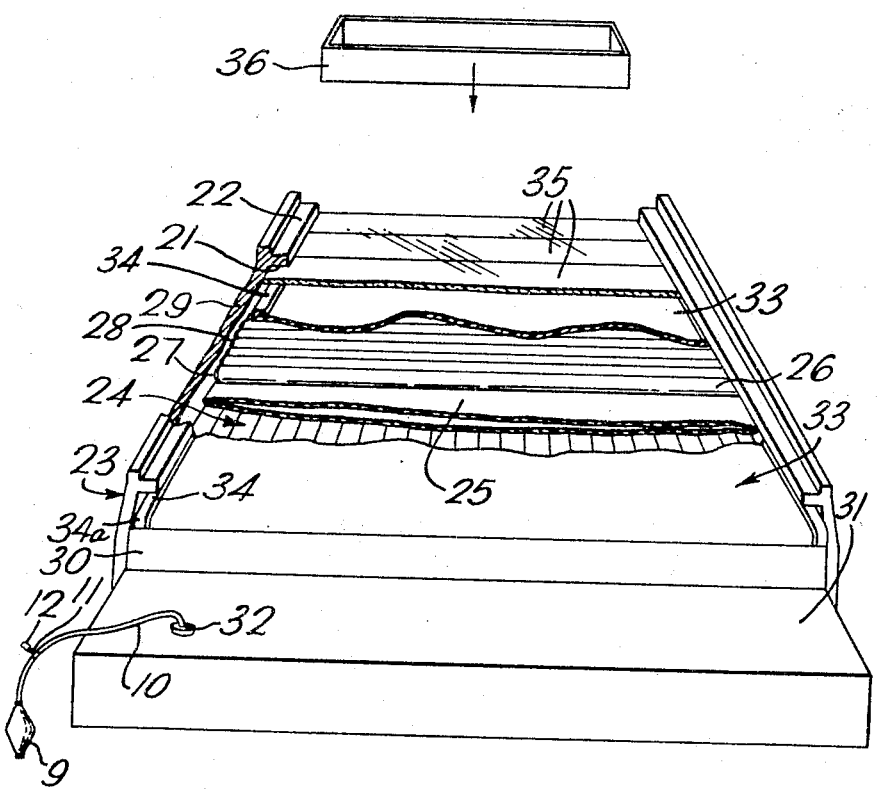
FIGURE 4 is a front perspective view of another form of apparatus with parts broken away to expose details of its interior construction.

The apparatus shown in FIGURES 1, 2 and 2A of the drawings comprises locating surfaces 1 constituted by the lower (inner) faces of the upper flanges 2 of a pair of opposed channel members 3 disposed in spaced-apart parallel relationship about the edges of a baseboard 4, so that a set of plates 5 (FIGURE 2A) to be coated may be disposed in side-by-side relationship with their opposite free edges beneath the upper flanges 2 of the respective channel members 3.

Pressure elements comprising tubes 6 extend between the channel members 3 and have terminal ferrules 7 constituting pressure pads opposed to the respective locating surfaces 1 of upper flanges 2 of the channel members, so as to be capable of engaging the under-surfaces of plates 5 in regions beneath the locating surfaces 1 and, regardless of variations in their underface planes due to different thicknesses of the plates, of holding the plate margins firmly engaged with the locating surfaces 1 so that the upper surfaces of the plates 5 are co-planar, as shown in FIGURE 2A.

In this embodiment, an envelope comprising an inflatable bag 8 is disposed between the baseboard 4 and the tubes 6 whereby inflation of such bag raises the tubes 6 to urge ferrules 7 thereof towards the locating surfaces 1 of the upper flanges 2 of the channel members 3. Inflation of the bag may be achieved in any convenient manner, for instance, by a squeeze bulb or Higginson's syringe 9 as shown.

The syringe 9 is connected to the bag 8 by a flexible pipe 10 fitted with a T-piece 11, the side arm of which is connected to a moulded rubber valve containing a ball 12 that seals the valve but which can be unseated by pinching the valve when deflation of bag 8 is desired.

The baseboard is conveniently formed of laminated wood or other stable material and is faced with a thermoset plastics laminate for protection against spilled coating material. Its ends are protected by channel members 13, 14 that serve to retain the tubes 6 in place.

The spreader device used with such apparatus may be of the conventional construction used in the coating of thin-layer chromatography plates, although it is preferred to use a spreader device as shown in FIGURE 3 that comprises a pair of end members 15 the lower edges of which are plane and adapted to run on the plate surfaces to be coated near the margins thereof engaged by the locating surfaces 1, these end members 15 being spanned by two spaced-apart walls 16, 17 to define therewith a container for coating slurry, the lower edge of the wall 16 being spaced upwardly from the lower edges of the end members 15 so as to permit coating slurry to flow from said container onto the plates. This wall 16 may constitute a fixed doctor blade or, as shown, the spreader may incorporate an adjustable doctor blade 18 arranged on the external face of wall 16, such doctor blade 18 being held in an adjusted position on the wall 16 by means of adjusting screws 19. Adjustment of the blade 18 to obtain a desired coating slurry thickness is facilitated by calibrated reference lines, as shown at 20, on the wall 16 and with which the upper edge of the blade 18 may be set in register.

Although in the illustrated embodiment the pressure transmitting elements comprise tubes 6 and their aforesaid end ferrules 7 arranged side-by-side in the manner of a bed of parallel rollers, other forms of pressure element may be employed. Thus in a modified apparatus, the pressure elements comprise bridges of sheet metal having upstanding terminal pressure pads opposed to the locating surfaces 1.

Referring now to FIGURE 4 the apparatus is provided with a pair of co-planar locating surfaces 21 formed by the undersides of two upper flanges 22. Each flange 22 extends inwardly from a channel member 23 forming one side of the apparatus. The bottom flanges (not shown) of the two channel members 23 form feet on which the apparatus rests, and the webs 29 of the channel members 23 are fixed respectively to the longer pair of parallel sides of a baseboard 24 which is rectangular in plan. Baseboard 24 is similarly constructed to baseboard 4 in FIGURES 1 to 3.

Resting on the baseboard 24 is a flat inflatable bag 25 disposed beneath an array of pressure elements comprising metal tubes 26. Each tube 26 is closed at each end by a domed end cap 27 having a cylindrical rim 28 which forms a continuation of the cylindrical surface of the tube 26. The tubes 26 touch one another and are held in position by the webs 29 of the side channel members 23 and by a pair of end plates 30 one of which is disposed at each end of the apparatus. An extension 31 is provided at each end of the apparatus and the front extension (shown) is provided with a nozzle 32 communicating with the bag 25. In FIGURE 4 a flexible tube 10, a T-piece 11 and a Higginson's syringe 9 are shown connected to the nozzle 32 as in FIGURE 1.

The array of rollers 26 is covered by a rectangular thin flexible panel 33, preferably of a translucent material. One very suitable material is that known under the registered trademark "Perspex." The length of the panel 33 is such that its ends just overlap the top edges of the end plates 30, and the width of the panel 33 is equal to the spacing between the webs 29 of the two channel members 23. Instead of being made from "Perspex" (polymethyl methacrylate) other pliant plastics materials may be used, for example, polyvinyl chloride.

Each longer edge of the panel 33 has attached to it an upwardly projecting rib 34 of rectangular cross-section and located beneath one of the locating surfaces 21. At its front end 34a the rib is chamfered. The chamfer enables the plates 5 to be slid more easily into the side slots formed between the opposing surfaces of the upper flanges 22 and the ribs 34.

In the figure three glass plates 35 to be coated with a slurry are shown arranged side-by-side at the rear end of the apparatus, the slurry being contained in a spreader device 36 similar in construction to that shown in FIGURE 3.

The apparatus is used as follows:

Glass plates 35 to be coated in the apparatus are inserted from the front by engaging their opposite end portions in the slots formed between the flat top-surfaces of the ribs 34 and the flat undersurfaces of the flanges 22. With the bag 25 deflated there is more than sufficient depth in the slots to accommodate the thicknesses of the plates 35.

The plates 35 are inserted one by one so that they touch one another along their longer edges. When the desired number of plates has been inserted, the syringe is operated to inflate the bag 25. Such acting through said bag applies a uniform upward pressure on the array of tubes 26 which thus lift to raise the flexible Perspex panel and the glass plates 35 resting thereon until the upper faces of their end portions engage the co-planar locating surfaces 21. When this occurs the top faces of all the plates 35 are co-planar and each plate is firmly clamped at its ends between the locating surfaces 21 and the ribs 34. The ribs 34, like the panel 33, are flexible so that they bend to conform to any variations in the levels of the undersurfaces of the plates caused by their varying thicknesses. As a result a relatively thin plate is firmly pressed against the locating surfaces 21 despite the fact that it might have a relatively thicker plate on each side.

The coating is then applied to the plates 35 by the spreader device 36 in the same manner as described above with reference to FIGURES 1 to 3.

When all the plates 35 have been coated the pressure in the air bag 25 is released by squeezing the ball valve 12. The panel 33 and array of tubes 26 subside and allow the coated plates 35 to be individually slid from beneath the flanges 22 at the rear of the apparatus. Alternatively the whole panel 33 can be withdrawn with the plates resting on it in the manner of a tray. The coating on the plates can then be dried.

Should any of the slurry seep between the plates 35 during a coating operation, which is almost inevitable, it is prevented by the panel 33 from contaminating the tubes 26 and the air bag 25. Thus these parts of the apparatus remain clean, and between successive uses of the apparatus it is only necessary to clean the panel 33. This may be done either by wiping it down with a cloth while in the apparatus or by temporarily removing it from the apparatus and washing it down.

In addition to facilitating cleaning of the apparatus, the panel 33 helps distribute the upward pressure of the tubes 26 to the ribs 34. Also, by virture of its translucent nature, it hides the array of tubes 26 so that the apparatus presents an aesthetically pleasing appearance.

Similarly the ribs 34 serve not only to distribute the upward pressure of the tubes 26 more uniformly against the undersurfaces of the plates 35, but also to confine any slurry on the panel 33 to the space between the ribs 34 so that it will not flow beyond the side edges of the panel and thus into the space housing the tubes 26 and the bag 25.

As in all other embodiments of this invention it should particularly be noticed that the plates 35 are only urged upwards by pressure applied directly beneath the locating surfaces 21 and are not urged upwards by pressure applied intermediate their ends. This is most important as, because of the thinness of plates normally used for thin-layer chromatography, any upward force applied between their ends, even if it is a distributed pressure, will result in some upward bowing or bulging of the plates with the result that the thickness of the coating applied will progressively increase from the centres of the plates towards their ends.

Figure 5:
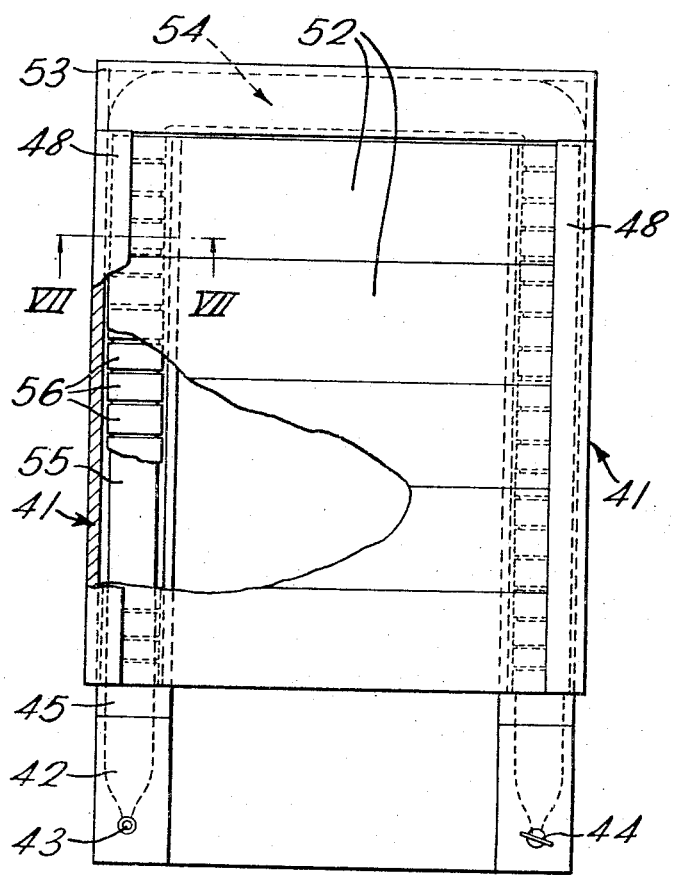
FIGURE 5 is a plan view of a further form of apparatus with parts broken away to expose details of its interior construction.
Figure 6:
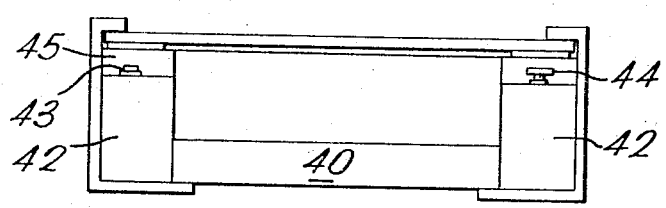
FIGURE 6 shows the apparatus of FIGURE 5 in end elevation.

FIGURES 5, 6 and 7 show a further embodiment of the apparatus. As in the previous embodiments a rectangular baseboard 40 is provided. Along its two longer sides are upwardly opening channel members 41 each having a rectangular cross-section as shown in FIGURE 7. Each channel member 41 opens at its front end into a box 42 which is fixed to the side of the baseboard 40 and is slightly shallower than the channel member 41.

A nozzle 43 projects from the top surface of one of the boxes 42 and a manually operable exhaust valve 44 is mounted on the top surface of the other box. A front plate 45 slopes upwardly and rearwardly from each box 42 and terminates at the top of the inner side-wall 46 of the channel member 41 to close the front of the channel member.

Referring particularly to FIGURE 7 it will be seen that each of the channel members 41 has an outer side-wall 47 which projects above the level of the inner side-wall 46 and has an inwardly turned horizontal lip 48. The undersurfaces of the lips 48 on the two channel members 41 are flat and co-planar and provide locating surfaces 50 against which may be pressed opposite end portions of glass plates 52 spanning side-by-side across the top of the apparatus as shown in FIGURE 5.

At their rear ends the channel members open into an inverted channel element 53 fixed to the base 40 and extending across it. The end channel element 53 defines with the base a passage of square cross-section which accommodates the intermediate portion 54 of a U-shaped inflatable tube 55 suitably made of rubber. The two end portions of the tube 55 extend through the channel members 41, respectively, and are connected at their front ends with the nozzle 43 and the exhaust valve 44.

Overlying the end-portions of the tube 55 in each of the channel members 41 is a row of flat topped pressure elements shown, for simplicity, as plates 56. The plates are held by means (not shown) against movement towards and away from one another and from slipping down in the channel member around the inflatable tube 55. Each plate is a close fit between the sidewalls 46 and 47 of the channel member 41 so that inflation of the tube 55 presses the plates 56 resiliently upwards towards the overlapping lip 48 on the outer side-wall 47.

To use the apparatus, glass chromatographic plates 52 to be coated are slid one-by-one towards the rear of the apparatus with their opposite end portions respectively engaging between the locating surfaces and the top edges of the inner side-walls 46. When the desired number of glass plates 52 are crowded up against one another the valve 44, if open, is closed and the nozzle 43 is connected to a pump such as a Higginson's syringe. The pump is operated to inflate the tube 55 so that the pressure elements or plates 56 are pressed upwardly against the undersides of the glass plates 52. It will be noticed that the plates 56 are each less than half the width of the glass plates 52 so that each glass plate is pressed evenly upwardly at each of its ends by at least three of the plates 56. The pressure in the tube 55 is increased sufficiently to clamp the top surfaces at the ends of each glass plate firmly against the locating surfaces 50. A spreader device similar to that previously described may then be run down the line of glass plates 52 to coat each with a uniform layer of slurry. When all the plates 52 have been coated the upward pressure of the plates 56 is relieved by opening the valve 44 so that the tube 55 deflates. The plates 52 then rest on the top edges of the inner side-walls 46 and may be slid to either the front or rear of the apparatus to free them.

An advantage of the construction described immediately above is that it is simple to construct. Any seepage of the slurry between the glass plates 52 falls onto the baseboard 40 and may be easily wiped off after the apparatus has been used.

In the following descriptions of the modifications of the apparatus of FIGURES 5 to 7, for simplicity of understanding corresponding parts have been correspondingly numbered but where they are differently shaped they are distinguished by a following letter.

In the modification of the apparatus shown in FIGURE 8 the inner side-wall 46a is formed with a lip 60 which projects horizontally over the tube 55 and terminates in the same vertical plane as the tube axis. The outer side wall 47a is also provided with a lip 48a which is shorter and is spaced further above the top of the inner side wall 46a than is the case with the lip 48 in FIGURE 7. The pressure elements in this case comprise angle plates 61 having one horizontal flange 62 trapped between the tube 55 and the lip 60, and one vertical flange 63 which projects upwardly from the channel member 41a alongside the outer side-wall 47a.

When tube 55 is inflated the angle plates 61 are forced upwards in the channel member 41a so that the top edges of the vertical flanges 63 pass upwards through the gap formed between the outer side-wall 47a and the lip 60, and lift each glass plate 52 from the top surface of the lip 60 on which it had previously been resting, and press it upwards against the locating surface 50a formed by the undersurface of the lip 48a. With all the glass plates 52 trapped in this position the spreader device can be passed over their top surfaces as previously described.

The embodiment of FIGURE 8 has the advantage that the increased space for accommodating the end portions of the glass plates 52 enables plates having a wider thickness variation to be used than the embodiment of FIGURE 7.

In the embodiment of FIGURE 9 the tube 55 extends through a channel member 41b having an inner side-wall 46b and an outer side-wall 47b. The inner side-wall is provided with a small inwardly directed lip 60b and, at the same level, the outer side-wall 47b is joggled inwardly to form a locating surface 50b, for engagement by the glass plate 52, and an abutment surface 68 co-planar with the lip 60b. A pressure element 66, this time of inverted T-shape, is trapped in the channel member 41b between the tube 55, the lip 60b and abutment surface 68. The stem 69 of the T projects upwardly alongside the lip 60b to raise and lower the edge of the glass plate according to whether the tube 55 is inflated or deflated. The terminal portion of the stem 69 of the T is coated with a layer 67 of resilient material, such as rubber, to distribute the upward pressure more evenly along the underside of the end portion of the plate 52.

In the embodiment of FIGURE 10 the channel member 41c has an inner sidewall 46c and an outer side-wall 47c the upper edge-portion of which is turned over to provide a flange 72 above the tube 55. The undersurface of the flange 72 is stepped to provide a horizontal locating surface for engagement by the top face of an end-portion of glass plate 52. Disposed between the tube 55 and the flange 72 is a resilient flexible strip, suitably rubber 75, having a castellated upper surface and extending lengthwise above the tube 55. The raised areas 76 formed by the castellations transmit the upward force, exerted by the tube when inflated, to the edge portions of the plates 52 so that their upper faces are pressed firmly against the locating surface 50c. The strip 75, being flexible, bends to accommodate the vertically spaced undersurfaces of plates of different thickness. Preferably the spacing between the raised areas 76 is such that each plate end portion is engaged by at least three of the raised portions. Such spacing ensures that the risk of any of the glass plates 52 being slightly tilted is negligible.

The embodiments of FIGURES 11 and 12 are different from those hitherto described in that other means than an inflatable bag or tube are used to resiliently press the opposite edge portions of the plates 52 against the co-planar locating surfaces.

Referring to FIGURE 11, the channel member 41d is mounted on a base 40d and has an inner side-wall 46d and an outer side-wall 47d having an inwardly directed lip 48d at its upper end. The undersurfaces of the lips 48d on opposite sides of the appparatus are co-planar and provide locating surfaces 50d.

The floor of the channel member 41d is formed with closely spaced apertures 80 which register with respective holes 81 in the base. Extending through individual holes are upright rods 82 having flat plate-like heads 83 at their upper ends. Beneath the base 40d the rods 82 are cranked inwardly to provide horizontally extending legs 89. The legs 89 engage a common cam-shaft 84 extending parallel to the channel members 41d beneath the base 40d, rotation of the camshaft being arranged to draw the rods 82 downwards.

An elongated compression spring 85 is coiled around the portion of each rod 82 in the channel member 41d and engages, at opposite ends, the head 83 and the floor of the channel member. Extending lengthwise over the tops of the heads 83 is a resilient strip 86 of rubbery material which fits snugly between the side-walls 47d and 46d. With the parts in the position shown in FIGURE 11 the springs 85 are pressing the heads 83 towards the edge portion of the glass plate 52, the pressure being transmitted to, and distributed over the undersurfaces of the glass plates at their end portions by the flexible resilient strip 83. The plates 52 are thus firmly pressed at their end portions against the locating surfaces 50d.

To release the plates 52 from the apparatus after they have been coated, the upward pressure on them is first relieved by rotating the cam-shaft 84 manually by means of a handle (not shown) at one end of the apparatus. This forces the legs 89 downwards and compresses the springs 85. This allows the plates 52 to descend until they are resting on the tops of the inner side-walls 46d. They can then be slid along the side-walls 46d to the rear end of the apparatus where they are freed.

In the modification of FIGURE 12, the fixed-position channel members of the type illustrated in FIGURES 7–11, for example are dispensed with entirely, and upward clamping pressure is applied to the edge portions of the glass plates to be coated by compression of two resilient rubber strips 90 each extending along one longer edge of the baseboard 40e. The strip 90 is of rectangular cross-section.

Illustratively, the means for compressing each said strip 90 comprises a metal plate 91 which is fixed to the underside of the baseboard 40e beneath the position of the strip 90 and a second metal plate 92, having a lateral flange 93, which is hinged at its lower edge to a protruding edge of the plate 91. The plate 92 is thus able to be swung to and from a vertical position in order, respectively, to trap or free the end portion of a glass plate 52 resting on the top surface of the rubber strip 90. The lateral flange 93 has a rounded protuberance 94 extending along the terminal portion of its undersurface so that final rotational movement of the plate 92 to the position shown in FIGURE 12 is accomplished, when there is a glass plate 52 resting at its end on the strip 90, by a downward pressure on the plate 52 so that it compresses the rubber strip 90. Thus, with the parts positioned as shown in FIGURE 12, said strip functions not only substantially as does a previously described rib 34 and a strip 86 in conforming to the underface planes of the glass plates to be coated but also as a component of resilient yielding means for clamping an edge portion of the plates interposed between itself and a related protuberance 94 serving as a locating surface against said protuberance. Preferably, lower portion of the plate 92 is provided with a turnbuckle 96 which engages in a recess in the side of the baseboard 40e when the plate 92 is in the position shown, and which is rotatable to lock the plate 92 in its upright position. The undersurfaces of the protuberances 94 on each side of the base 40e are co-planar and provide the locating surfaces against which the top faces of the end portions of the plates 52 are resiliently pressed by the rubber strips 90, when the associated plates 92 are locked in their upright positions.

To release the plates 52 after they have been coated, the turnbuckles are rotated and the plates 92 are swung away from the sides of the baseboard 40e.

Various modifications to the above described embodiments of the invention are possible. For example, the strip 75 of FIGURE 10 may be replaced by a flexible strip having closely spaced transverse ribs in place of the castellated upper surface.

We claim:

Apparatus for holding a set of plane-surfaced plates of differing thicknesses side-by-side with the upper faces of the plates providing a continuous horizontal surface for application of a uniformly thick layer of a liquid coating medium thereto comprising: a base; longitudinal spaced-apart members operatively carried by said base, each said member including a plate-locating surface spaced from and overlying said base, the plate-locating surfaces lying in the same horizontal plane; the spacing between said longitudinal members being such as to provide an uninterrupted plate-receiving space extending horizontally between said locating surfaces for containing the intermediate portions of said plates; a resilient, flexible strip disposed beneath each of said locating surfaces to engage the underfaces of the plates without upwardly bowing said intermediate portions of the plates spanning said plate-receiving space and being conformable to variations in the underface planes of the plates to be coated resulting from their different thicknesses; a plurality of pressure-transmitting elements disposed beneath each said strip and having depending portions; said elements being combined with spring means biasing same into engagement with the under surface of the plates to be coated, whereby said plane-surfaced plates are maintained clamped between the corresponding locating surfaces and resilient flexible strips, and cam means operative on said depending portions of said pressure-transmitting elements to release said elements from the clamping function.

References Cited

UNITED STATES PATENTS

| | | | |
|---|---|---|---|
| 628,347 | 7/1899 | McDade | 95—76 |
| 654,421 | 7/1900 | Soltmann | 95—76 |
| 895,577 | 8/1908 | McIntire | 95—76 |
| 1,075,913 | 10/1913 | Hirschberg et al. | 95—76 |
| 1,146,974 | 7/1915 | Sweigard | 95—76 |
| 1,457,530 | 6/1923 | Larsen | 95—76 |
| 1,547,945 | 7/1925 | Mustapich | 118—415 |
| 1,780,701 | 11/1930 | Crane | 95—76 |
| 2,284,972 | 6/1942 | Carson | 269—254 X |
| 2,556,305 | 6/1951 | Vickers | 269—22 |
| 2,561,196 | 7/1951 | Gauthier | 269—310 |
| 2,685,629 | 8/1954 | Peck | 210—125 |
| 2,852,463 | 9/1958 | Gutzmer | 269—22 X |
| 3,064,320 | 11/1962 | Blaszkowski | 52—2 |
| 3,093,050 | 6/1963 | Smith | 95—76 X |
| 3,140,087 | 7/1964 | Heath et al. | 269—22 |
| 3,161,543 | 12/1964 | Borders et al. | 118—503 X |

MORRIS KAPLAN, *Primary Examiner.*